Figure 6:
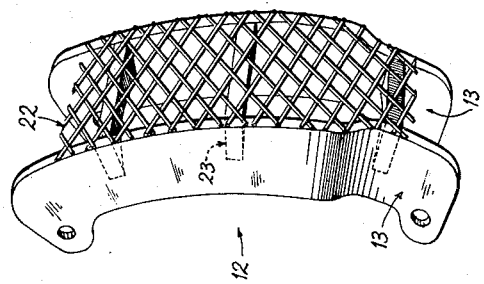

Feb. 25, 1958 P. J. M. T. ALLARD 2,824,767
TREAD DEVICE FOR VEHICLES
Filed July 7, 1953. 2 Sheets-Sheet 1
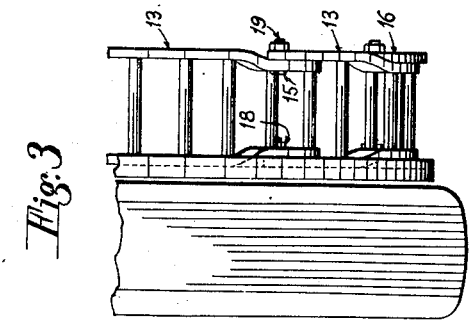
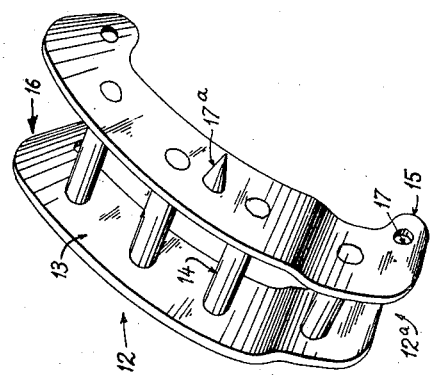
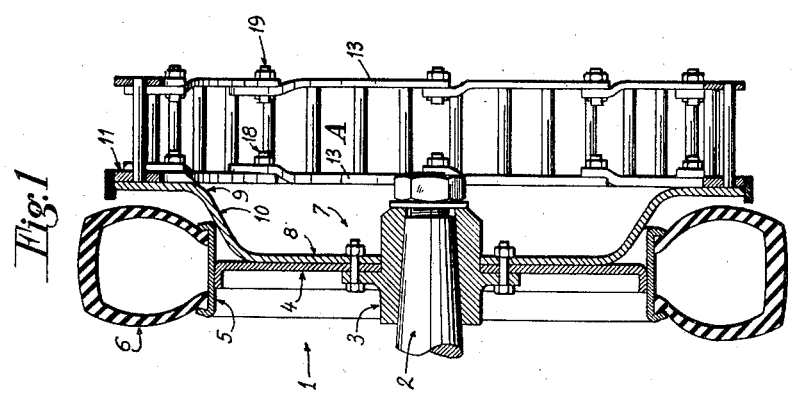
Pierre Jean Marie Theodore Allard
INVENTOR
By Richardson, David and Nordon
his ATTYS.

Feb. 25, 1958

P. J. M. T. ALLARD 2,824,767

TREAD DEVICE FOR VEHICLES

Filed July 7, 1953

2 Sheets-Sheet 2

Pierre Jean Marie Theodore Allard
INVENTOR
By Richardson, David and Nordon
his ATTYS.

United States Patent Office 2,824,767
Patented Feb. 25, 1958

2,824,767

TREAD DEVICE FOR VEHICLES

Pierre Jean Marie Theodore Allard, Eaubonne, France

Application July 7, 1953, Serial No. 366,412

Claims priority, application France July 28, 1952

12 Claims. (Cl. 301—41)

Vehicles with wheels provided with tyres, and in particular heavy vehicles such as tractors, often have considerable difficulty in moving on soft ground. The tyres tend to sink into the earth when the latter is not very resistant and this in turn makes the wheels slip.

One object of the present invention is to remove this drawback by providing the wheels of vehicles with a device which will enable the bearing surface and consequently the grip on to the ground to be increased, whenever this is required.

The device according to the invention is particularly remarkable in that it includes a mounting member which is adjustable so that it can be fixed concentrically to the rim and/or the hub of a wheel, and supporting parts each consisting of two cross-braced arches in the form of circular arcs; these parts being adjusted so that they can be fixed to the circumference of the said mounting member and to one another in such a way that they form a circular cage, continuous or not, with a diameter slightly less than that of the tyre of the wheel to which the device is to be fixed, the vehicle being supported on these cages when the wheel tyres sink slightly into the earth because of the softness of the ground over which the vehicle is moving.

This device can be fixed on to the wheel and taken off it with the same simplicity. As it is composed of a number of independent parts, it is not clumsy and can be easily transported on the vehicle with which it is to be used.

Other features of the invention will be shown in the specification which follows.

In the drawing attached—only given as an example—

Figure 5:
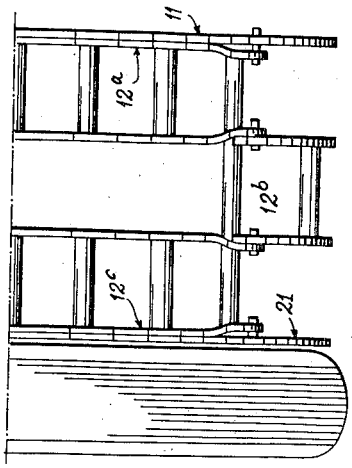
Figure 4:
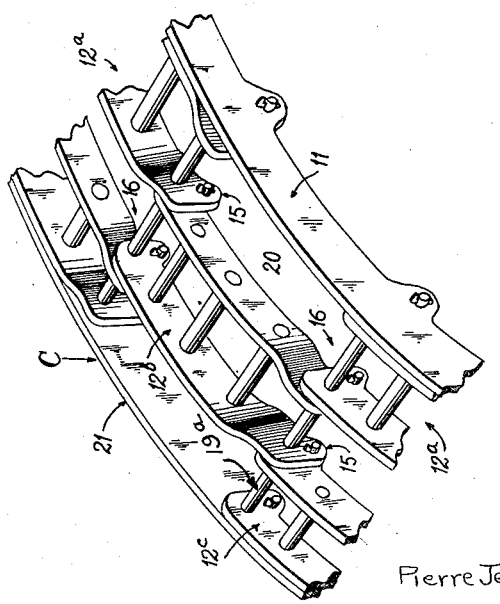

Fig. 1 is a cross-section of a wheel of a vehicle provided with the device according to the invention, Fig. 2 is a perspective view of one of the parts of the device according to the invention, Fig. 3 is a view of a part of a wheel provided with the device according to the invention, Fig. 4 is a perspective view of another embodiment of the device according to the invention, Fig. 5 is a view of a portion of a wheel provided with the tread device of Fig. 4;

Fig. 6 is a view of a part of another embodiment of the device according to the invention.

According to the embodiment shown in Fig. 1, a wheel 1 is placed on an axle 2 belonging, for example, to a tractor. This wheel is fixed to the hub 3 and comprises a disc 4 and a rim 5 upon which is placed a tyre 6.

A mounting member in the form of a circular plate 7 is movably connected to the wheel 1, by means for example of bolts securing it to the hub 3 and/or the disc 4. This plate comprises a part 8 which is laid against the disc 4 of the wheel 1 and a peripheral part 9 which is in a plane parallel to that of the part 8, these two parts being connected to each other by a curved part 10.

It will be noted that the plate 7 has a slightly smaller radius than the tyre 6.

At its periphery, the plate has a strengthening rim 11 which is fixed on it by any suitable method, for example by bolts or screws or pins. The part 9 of the reinforced plate 7 really supports the tread device.

This device comprises independent tread elements 12 (Fig. 2) which may be combined in various ways in order to increase more or less the bearing surface of the wheels of the vehicle.

Each tread element 12 (Fig. 2) comprises two arc-shaped members or arches 13 each consisting of a curved plate whose outer arc radius is slightly less than that of the tyre of the wheel 1. These arches 13 are joined by cross-braces 14. At one of the ends of the element 12, the spacing of the arches 13 is narrowed so as to form a male outer end 15 which is adapted to fit into the inner end 16 of the adjacent element. Each of the ends of the arches 13 has a hole 17, the holes of the adjacent elements being coaxial when these elements are fitted one inside the other.

The tread elements 12 can be combined in various ways.

According to a first embodiment (Figs. 1 and 3), they can be connected together by introducing the narrowed end 15 of an element 12 into the end 16—not narrowed—of the other, thus forming a continuous circular cage A (Fig. 1).

Advantageously, each part or element 12 may comprise a point or key member 17a (Fig. 2) corresponding to a hole provided in the rim 11 of the plate 7; this enables this part to be centered on to the plate without any trouble. Bolts or pins 18 are used (Fig. 3) in order to secure the parts 12 to the plate 7.

As shown on Figs. 1 and 3, each bolt 18 is used for simultaneously securing to the plate 7 two adjacent parts 12. Bolts 19a connect together the opposite arches 13 of the same parts 12.

It is possible, if desired, to dispose the elements 12 on the plate 7 with spaces between them, the number of elements being preferably even.

When the vehicle has to move on particularly soft ground, it can be helpful to use tread devices comprising more than one row of elements 12 (Figs. 4 and 5). In this case, two methods may be used, first of all, a continuous cage A (Fig. 1) is made of elements 12, as above described, then a second cage A is secured laterally to the first, each bolt 19a connecting four elements 12, instead of two, as shown in Figs. 1 and 3.

Another method can be followed as shown in Figs. 4 and 5, that is, by forming a cage C by means of elements 12 arranged in zigzag. In this case, when the first row of elements 12a are secured to the plate 7 resting immediately against it, a space corresponding to the place taken up by one of these elements is left in 20 between two adjacent elements. Then the ends of each pair of elements 12a separated by a space 20 are connected together by another elements 12b laterally secured to the elements 12a, the narrowed end 15 of the element 12b being secured to the non-narrowed end 16 of an element 12a and vice versa. Then, if desired, a third row may be formed, using elements 12c set out like the elements 12a.

When several rows of elements 12a, 12b and 12c are used, it is preferable to secure to the outside row a strengthening rim 21 similar to the rim 11 of the plate 7, especially in the zigzag arrangement of Figs. 4 and 5.

The cross-bracings connecting together the arches 13 (Fig. 2) may have any type of section. Instead of using circular bars 14, it is possible to use bars with sharp edges, to improve the grip. In order to increase the grip even more, the outer periphery of the element 12 may be covered with strips having sharp edges or teeth. It is thus possible to form a kind of grid 22 which totally covers the outside part of the elements 12 coming into contact with the ground (Fig. 6). In this case it is preferable to use cross-bracings 23 having a rectangular section (Fig. 6) which form a better support for the grid 22 than would the bars 14 (Fig. 2).

The operation of the device according to the invention is obvious:

When the vehicle is just about to come on to ground in which its tyres are likely to sink, the plate 7 is secured to the wheel. Then, one or several cages made of elements 12 are fixed on to the plate, the number of elements and the number of rows used depending on the more or less soft nature of the ground. As the diameter of the plate is slightly less than that of the tyre, the device according to the invention does not come into contact with the road when the vehicle is moving on sufficiently solid ground for the tyres not to sink into it and its motion is not impeded. As soon as the tyres have sunk sufficiently into the ground, the device according to the invention comes into contact with the ground and increases the grip of the wheels.

It will be noted that since it is formed of separate parts, the device according to the invention is easy to handle, even where very large wheels are concerned, and it is not cumbersome from the transport viewpoint.

Although specific embodiments of the invention have been described hereinbefore, it is to be understood that many changes and modifications may be made therein without departing from the spirit of the invention or the scope of the appended claims.

Having now described my invention what I claim as new and desire to secure by Letters Patent is:

1. A tread device for a vehicle wheel comprising: a mounting member having a symmetrical shape about an axis, tread elements symmetrically arranged on one side of the mounting member on a geometrical cylinder concentric with said axis and disposed axially to one side of the wheel, means holding the tread elements and the mounting member rigidly assembled, these means permitting of individual assembly of each tread element, each tread element comprising two plates spaced apart in the direction of said axis and lying in planes substantially perpendicular to the latter and cross-braces extending in a direction substantially parallel to said axis and connecting each pair of plates so as to constitute an independent rigid tread unit which has substantially radially extending through-way apertures the outermost points of the tread elements with respect to said axis lying on a geometric cylinder having a diameter which is slightly smaller than the maximum diameter of the wheel and means detachably securing the mounting member to the wheel in coaxial relationship thereto.

2. A tread device as claimed in claim 1, wherein sharp edges are provided on the regions of said cross-braces that face away from said axis.

3. A tread device as claimed in claim 1 wherein said cross-braces are in the form of substantially rectangular-section bars whose outer edges with respect to said axis are substantially on a level with the outer edges of said plates relative to said axis and are provided with sharp edges.

4. A tread device as claimed in claim 1 wherein said tread elements further comprise a metal grid fixed to the outer surfaces of said tread elements relative to said axis and spanning the space between each pair of plates.

5. A tread device for a vehicle wheel comprising: a mounting member having a symmetrical shape about an axis, tread elements symmetrically arranged on one side of the mounting member on a circle concentric with said axis and disposed axially to one side of the wheel, in a plane perpendicular to said axis, each tread element being in contact with its adjacent tread elements, means securing each tread element to its adjacent tread elements, thereby constituting an annular cage structure, fixing means fixing the tread elements to the mounting member, the outermost points of the tread elements with respect to said axis lying on a geometric cylinder whose diameter is slightly smaller than the maximum diameter of the vehicle wheel, and means detachably securing the mounting member to the vehicle wheel in coaxial relationship thereto, each tread element comprising two plates spaced apart in the direction of said axis and lying in planes substantially perpendicular to the latter and cross-braces extending in a direction substantially parallel to said axis and connecting each pair of plates so as to constitute an independent rigid tread unit which has substantially radially extending through-way apertures.

6. A tread device as claimed in claim 1, wherein each tread element is provided at one end thereof with a narrowed portion constituting a male end and at the other end with a female end shaped as the female counterpart to said male end, the tread elements being assembled in interlocked relationship at said male and female ends.

7. A tread device for a vehicle wheel comprising: a mounting member having a symmetrical shape about an axis, tread elements symmetrically disposed about said axis in a plurality of axially adjacent planes perpendicular to the latter, means securing together the tread elements thereby forming a rigid annular cage, means securing the so assembled tread elements to the mounting member, and means detachably securing the latter to the wheel in coaxial relationship thereto, each tread member being composed of two plates spaced apart in the direction of said axis and lying in planes substantially perpendicular to the latter and cross-braces extending in a direction substantially parallel to said axis and connecting each pair of plates so as to constitute an independent rigid tread unit which has substantially radially extending through-way apertures, the outer edges of these plates with respect to said axis being arc-shaped in a plane perpendicular to said axis and having an arc radius concentric with and slightly less than the maximum radius of the wheel.

8. A tread device for a vehicle wheel including a rim and tyre, said tread device comprising: a mounting member having a symmetrical shape about an axis, tread elements symmetrically arranged on one side of the mounting member on a circle concentric with said axis and disposed axially to one side of the wheel, fixing members fixing the tread elements to the mounting member, the outermost points of the tread elements with respect to said axis lying within a geometric cylinder whose periphery is nearer the periphery of the tyre than that of the rim, and means detachably securing the mounting member to the vehicle wheel in coaxial relationship thereto, each tread element comprising two plates spaced apart in the direction of said axis and lying in planes substantially perpendicular to the latter and cross-braces disposed substantially parallel to said axis and connecting said plates so as to constitute an independent rigid tread unit which includes substantially radially extending through-way apertures.

9. A tread device as claimed in claim 8, wherein said mounting member is circular and has a diameter which is substantially equal to that of said geometric cylinder, said tread elements being mounted adjacent the periphery of said mounting member.

10. A tread device for a vehicle wheel, comprising: a mounting member having a symmetrical shape about an axis; sets of tread elements disposed in a plurality of axially adjacent planes perpendicular to said axis, the outermost points of the tread elements relative to said axis lying on a geometric cylinder whose axis coincides with said axis and whose diameter is slightly less than the maximum diameter of the wheel, each tread element comprising two plates spaced apart in the direction of said axis and lying in planes substantially perpendicular to the latter and cross-braces extending in a direction substantially parallel to said axis and connecting each pair of plates so as to constitute an independent rigid tread unit which has substantially radially extending through-way apertures; means securing the mounting member to one side of the wheel in coaxial relation thereto; means securing the set of tread elements in that of said planes which is immediately adjacent the wheel to the mounting member; and means securing together the tread elements which are in planes immediately adjacent one another, the last-mentioned means being so constructed and arranged that they permit the overall axial extent of the tread device to be varied by varying the number of sets of tread elements.

11. A tread device for a vehicle wheel, comprising: a mounting member having a symmetrical shape about an axis, tread elements symmetrically arranged about said axis, means holding the tread elements and the mounting member in a rigid cage-like assembly, these means permitting of an individual mounting of each tread element, means securing the mounting member to one side of the wheel in coaxial relation thereto, each tread element comprising two relatively thin plates spaced apart in the direction of said axis and lying in planes substantially perpendicular to the latter, several cross-braces disposed substantially parallel to said axis and rigidly connecting said two plates so as to constitute an independent rigid unit, the outermost points of the tread elements relative to said axis lying on a geometric cylinder whose axis coincides with said axis and whose diameter is slightly less than the maximum diameter of the wheel, the outermost points of the cross-braces lying substantially on said geometric cylinder, and the size of each tread element being small relative to the circumference of said geometric cylinder, whereby in the cage-like assembly of tread elements a large number of closely arranged ground-engaging cross-braces are obtained.

12. A tread device as claimed in claim 1, further comprising a key member provided on each tread element on the face thereof in immediate contact with the mounting member, apertures being provided in the mounting member to receive each key member, whereby the tread elements are keyed to the mounting member when they are fixed to the latter by said holding means.

References Cited in the file of this patent

UNITED STATES PATENTS

| | | |
|---|---|---|
| 965,443 | Culp | July 26, 1910 |
| 1,323,193 | Lambert | Nov. 25, 1919 |
| 1,332,273 | Schick | Mar. 2, 1920 |

FOREIGN PATENTS

| | | |
|---|---|---|
| 27,204 | Sweden | May 1, 1908 |
| 350,738 | Great Britain | June 18, 1931 |